United States Patent
Ebner et al.

(10) Patent No.: US 12,069,211 B2
(45) Date of Patent: Aug. 20, 2024

(54) WIRELESS LOCATION TRACKING TAG FOR MONITORING REAL TIME LOCATION-TRACKING APPARATUS FOR AN ELECTRONIC DEVICE

(71) Applicant: Xerox Corporation, Norwalk, CT (US)

(72) Inventors: Fritz Francis Ebner, Pittsford, NY (US); Matthew Dylan Coene, Ontario, NY (US); Aaron Zachary Borden, Pittsford, NY (US); Matthew David Levesque, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/325,192

(22) Filed: May 30, 2023

(65) Prior Publication Data
US 2023/0308557 A1    Sep. 28, 2023

Related U.S. Application Data

(60) Continuation of application No. 17/456,931, filed on Nov. 30, 2021, now Pat. No. 11,750,752, which is a
(Continued)

(51) Int. Cl.
| | |
|---|---|
| *H04N 1/00* | (2006.01) |
| *H04N 1/32* | (2006.01) |
| *H04W 4/029* | (2018.01) |

(52) U.S. Cl.
CPC ..... *H04N 1/00315* (2013.01); *H04N 1/32117* (2013.01); *H04W 4/029* (2018.02);
(Continued)

(58) Field of Classification Search
None
See application file for complete search history.

(56) References Cited

U.S. PATENT DOCUMENTS

| | | |
|---|---|---|
| 7,958,562 B2 | 6/2011 | Gaucas |
| 8,086,248 B2 | 12/2011 | Coronel et al. |

(Continued)

FOREIGN PATENT DOCUMENTS

| | | |
|---|---|---|
| CN | 103925923 | 6/2017 |
| JP | 2009187103 | 8/2009 |

OTHER PUBLICATIONS

Moskowitz, "What is an Essential Worker in New York State?" ILR School, 6 pages (2020).
(Continued)

*Primary Examiner* — Andrew H Lam
(74) *Attorney, Agent, or Firm* — Fox Rothschild LLP

(57) ABSTRACT

A system for tracking the location of an electronic device includes an electronic device and a wireless location tag. The wireless location tag includes a microcontroller unit, and a modular connector interface configured to be communicatively coupled to a port of the electronic device. The wireless location tag is configured to establish an Internet connection to one or more backend electronic devices in response to detecting that the wireless location tag has been communicatively coupled to the port of the electronic device, obtain identifying information that is associated with the electronic device, and identify tag identifying information associated with the wireless location tag. The wireless location tag is also configured to send one or more instructions to the one or more backend electronic devices via the Internet connection, and send one or more ping messages to the one or more backend electronic devices.

16 Claims, 4 Drawing Sheets

Related U.S. Application Data division of application No. 16/878,753, filed on May 20, 2020, now Pat. No. 11,245,799, which is a continuation of application No. 16/253,347, filed on Jan. 22, 2019, now Pat. No. 10,694,053.

(52) U.S. Cl.
CPC ............... *H04N 2201/0037* (2013.01); *H04N 2201/0049* (2013.01); *H04N 2201/0055* (2013.01); *H04N 2201/0072* (2013.01); *H04N 2201/3205* (2013.01); *H04N 2201/3207* (2013.01)

(56) References Cited

U.S. PATENT DOCUMENTS

| | | |
|---|---|---|
| 8,548,738 B1 | 10/2013 | Kadous et al. |
| 8,583,400 B2 | 11/2013 | Thrun et al. |
| 8,934,112 B1 | 1/2015 | Gross et al. |
| 8,982,384 B2 | 3/2015 | Evanitsky |
| 8,986,867 B2 | 3/2015 | Baek |
| 9,201,619 B2 | 12/2015 | Gross et al. |
| 9,367,271 B2 | 6/2016 | Zehler et al. |
| 9,549,089 B1 | 1/2017 | Tredoux et al. |
| 9,740,447 B1 | 8/2017 | Krishnasamy et al. |
| 9,894,604 B1 | 2/2018 | Tran et al. |
| 10,104,247 B2 | 10/2018 | Packirisamy et al. |
| 10,116,826 B1 | 10/2018 | Ravikiran et al. |
| 10,440,221 B2 | 10/2019 | Ebner |
| 10,694,053 B1 | 6/2020 | Ebner et al. |
| 10,859,382 B1 | 12/2020 | Swidersky et al. |
| 2004/0075861 A1 | 4/2004 | Shima et al. |
| 2004/0264427 A1 | 12/2004 | Jaakkola et al. |
| 2006/0221901 A1 | 10/2006 | Yaqub et al. |
| 2007/0019670 A1 | 1/2007 | Falardeau |
| 2008/0040151 A1 | 2/2008 | Moore |
| 2008/0080458 A1 | 4/2008 | Cole |
| 2009/0028082 A1 | 1/2009 | Wynn et al. |
| 2010/0040029 A1 | 2/2010 | Doppler et al. |
| 2010/0299065 A1 | 11/2010 | Mays |
| 2011/0063663 A1 | 3/2011 | Kim et al. |
| 2011/0082638 A1 | 4/2011 | Khorashadi et al. |
| 2011/0137549 A1 | 6/2011 | Gupta et al. |
| 2011/0306364 A1 | 12/2011 | Gossain et al. |
| 2012/0075664 A1 | 3/2012 | Nichols et al. |
| 2012/0179737 A1 | 7/2012 | Baranov et al. |
| 2012/0274444 A1 | 11/2012 | Micali et al. |
| 2013/0211718 A1 | 8/2013 | Yoo et al. |
| 2013/0286942 A1 | 10/2013 | Bonar et al. |
| 2013/0346138 A1 | 12/2013 | Rai |
| 2014/0022587 A1 | 1/2014 | Coccia et al. |
| 2014/0256286 A1 | 9/2014 | Rangarajan |
| 2015/0153180 A1 | 6/2015 | Ettinger et al. |
| 2015/0189023 A1 | 7/2015 | Kubota et al. |
| 2015/0358790 A1* | 12/2015 | Nasserbakht ........... G06F 21/32 726/19 |
| 2015/0363141 A1 | 12/2015 | Fernandes et al. |
| 2016/0345137 A1 | 11/2016 | Ruiz |
| 2017/0006436 A1 | 1/2017 | Ahmed et al. |
| 2017/0008174 A1 | 1/2017 | Rosen et al. |
| 2017/0031925 A1 | 2/2017 | Mishra et al. |
| 2017/0090831 A1 | 3/2017 | Januszewski |
| 2017/0123737 A1 | 5/2017 | Januszewski et al. |
| 2017/0142549 A1* | 5/2017 | Herbert ................ H04W 4/021 |
| 2017/0171718 A1 | 6/2017 | Jeong et al. |
| 2017/0289813 A1 | 10/2017 | Pashkov et al. |
| 2017/0304732 A1 | 10/2017 | Velic et al. |
| 2017/0347388 A1 | 11/2017 | Cai et al. |
| 2018/0083795 A1 | 3/2018 | Zehler et al. |
| 2018/0172451 A1 | 6/2018 | Wang et al. |
| 2018/0237137 A1 | 8/2018 | Tovey et al. |
| 2018/0249298 A1 | 8/2018 | Jain et al. |
| 2018/0288722 A1 | 10/2018 | Blaser et al. |
| 2018/0316821 A1* | 11/2018 | Ebner ....................... G01S 5/00 |
| 2018/0357880 A1 | 12/2018 | Vijayakumari Mahasenan et al. |
| 2018/0367698 A1 | 12/2018 | Krishnasamy et al. |
| 2019/0014233 A1 | 1/2019 | Krishnasamy et al. |
| 2019/0026051 A1 | 1/2019 | Krishnasamy et al. |
| 2019/0026052 A1 | 1/2019 | Krishnasamy et al. |
| 2019/0114804 A1 | 4/2019 | Sundaresan et al. |
| 2019/0219409 A1 | 7/2019 | Tan et al. |
| 2019/0304102 A1 | 10/2019 | Chen et al. |
| 2019/0373407 A1 | 12/2019 | Bhatti et al. |
| 2020/0193609 A1 | 6/2020 | Dharur et al. |
| 2021/0011443 A1 | 1/2021 | Mcnamara et al. |
| 2021/0313075 A1 | 10/2021 | Mc Namara et al. |
| 2021/0390812 A1 | 12/2021 | Chaurasia et al. |
| 2022/0060856 A1 | 2/2022 | Wellig et al. |
| 2022/0163343 A1 | 5/2022 | Nurminen et al. |
| 2022/0270764 A1 | 8/2022 | Decker et al. |
| 2022/0343241 A1 | 10/2022 | Jha et al. |
| 2022/0368776 A1 | 11/2022 | Paranjpe et al. |

OTHER PUBLICATIONS

Ahmed et al., "Automatic Room Detection and Room Labeling from Architectural Floor Plans," 2012 10th IAPR International Workshop on Document Analysis Systems, pp. 339-343 (2012).

Ashraf, I., Application of Deep Convolutional Neural Networks and Smartphone Sensors for Indoor Localization, Jun. 6, 2019, Applied Sciences, 2019, 9: 2337, p. 1-10.

Bhoi, A., "Monocular depth Estimation: A Survey", [cs.CV] Jan. 27, 2019.

Cotera P. et al., "Indoor Robot Positioning using an Enhanced Trilateration Algorithm", International Journal of Advanced Robotic Systems, 2016, 13:110 | doi: 10.5772/63246.

Godard, C. et al., "Digging Into Self-Supervised Monocular Depth Estimation".

Information about Related Patent and Patent Applications, see section 6 of the accompanying Information Disclosure Statement Letter, which concerns Related Patents and Patent Applications.

Kang, H., Obstacle Detection and Alert System for Smartphone AR Users, VRST '19, Nov. 12-15, 2019, Parramatta, NSW, Australia, 2019 Association for Computing Machinery.

Kc, S., Obstacle Detection, Depth Estimation and Warning System for Visually Impaired People, Dec. 12, 2019, 2019 IEEE Region 10 Conference, pp. 863-865.

Maduskar, D. et al., "RSSI based adaptive indoor location tracker", Maduskar and Tapaswi Scientific Phone Apps and Mobile Devices (2017) 3.3, DOI 10.1186/s41070-017-0015-z.

Murata M. et al., "Smartphone-based Indoor Localization for Blind Navigation across Building Complexes", 2018 IEEE International Conference on Pervasive Computing and Communications (PerCom).

Saleh, K. End-to-End Indoor Navigation Assistance for the Visually Impaired using Monocular Camera, Jan. 17, 2019, 2018 IEEE International Conference on Systems, Man, and Cybernetics (SMC), pp. 3504-3508.

Saxena, A. et al., "Learning Depth from Single Monocular Images".

Seco, F. et al., "Smartphone-Based Cooperative Indoor Localization with RFID Technology", Sensors 2018, 18, 266.

Wang, S. et al., Detecting Stairs and Pedestrian Crosswalks for the Blind by RGBD Camera, Feb. 25, 2013, 2012 IEEE International Conference on Bioinformatics and Biomedicine Workshops (BIBMW), pp. 732-736.

Wikipedia, "Dijkstra's Algorithm," available online at: <https://en.wikipedia.org/wiki/Dijkstra%27s_algorithm> downloaded Feb. 3, 2023 (13 pages).

Wu, Y. et al., "HTrack: An Efficient Heading-Aided Map Matching for Indoor Localization and Tracking", IEEE Sensors Journal, vol. 19, No. 8, Apr. 15, 2019.

Yang, J. et al., "Indoor Localization Using Improved RSS-Based Lateration Methods", IEEE "Globecom" 2009 Proceedings.

\* cited by examiner

WIRELESS LOCATION TRACKING TAG FOR MONITORING REAL TIME LOCATION-TRACKING APPARATUS FOR AN ELECTRONIC DEVICE

CROSS-REFERENCE AND CLAIM OF PRIORITY

This patent document claims priority to and is a continuation of U.S. patent application Ser. No. 17/456,931, filed on Nov. 30, 2021, which is a divisional of U.S. patent application Ser. No. 16/878,753 filed on May 20, 2020, which is a continuation application of application Ser. No. 16/253,347 filed Jan. 22, 2019, the entirety of each of which are incorporated herein by reference.

BACKGROUND

It is often desirable to know the precise location of a print device within an environment. For example, an equipment provider or service provider may want to know the location of a print device in order to give a technician an accurate description of where to find the print device on a customer's premises. As another example, an equipment provider may want to know when a customer moves or disconnects a print device from an installed location.

Currently, real time location-tracking system (RTLS) tags are used to associate a print device with a particular location. However, associating such tags is often done manually, which is a time consuming process. For example, a technician may be asked to find an identifier associated with a print device, find an identifier associated with a tag, and associate them using, for example, a mobile application. However, such methods that rely on manual entry tend to be error prone, and require specialized training to implement.

This document describes a portable electronic device that can be used to automatically associate a print device with the portable electronic device (and therefore the location of the portable electronic device device) that addresses at least some of the problems described above, and/or other problems.

SUMMARY

In an embodiment, a system for tracking the location of an electronic device includes an electronic device and a wireless location tag. The wireless location tag includes a microcontroller unit, and a modular connector interface configured to be communicatively coupled to a port of the electronic device. The wireless location tag is configured to establish an Internet connection to one or more backend electronic devices in response to detecting that the wireless location tag has been communicatively coupled to the port of the electronic device, obtain identifying information that is associated with the electronic device, and identify tag identifying information associated with the wireless location tag. The wireless location tag is also configured to send one or more instructions to the one or more backend electronic devices via the Internet connection, and send one or more ping messages to the one or more backend electronic devices. The one or more instructions include the identifying information associated with the electronic device and the tag identifying information. The one or more backend electronic devices is configured to associate at least a portion of the received identifying information with at least a portion of the tag identifying information. Each ping message includes location information indicating a current location of the wireless location tag. The one or more backend electronic devices is configured to associate at least a portion of the location information with the at least a portion of the identifying information associated with the electronic device.

Optionally, the port may include an Ethernet port.

The wireless location tag may be configured to establish the Internet connection to the one or more backend electronic devices via the port. The wireless location tag may be configured to establish the Internet connection to the one or more backend electronic devices via a cellular modem of the wireless location tag.

The wireless location tag may be configured to obtain identifying information that is associated with the electronic device by obtaining one or more of the following: a media access control address of the electronic device; an Internet Protocol address of the electronic device; or a serial number of the electronic device.

The wireless location tag may be configured to obtain tag identifying information that is associated with the wireless location tag by retrieving a unique identifier associated with the wireless location tag from the microcontroller unit. The wireless location tag is further configured to determine the current location of the wireless location tag.

The wireless location tag may be configured to determine the current location of the wireless location tag using an indoor location system. In another embodiment, the wireless location tag is configured to determine the current location of the wireless location tag via a cellular network. The electronic device may be a print device.

The wireless location tag may be configured to compare the current location of the wireless location tag to a previous location of the wireless location tag, and in response to determining that the previous location is different than the current location, send a notification to the one or more backend electronic devices.

The wireless location tag may be configured to detect whether the wireless location tag is disconnected from a power source for a period of time, and in response to detecting that the wireless location tag is disconnected from the power source for the period of time, send a notification to the one or more backend electronic devices.

In an embodiment, a system for tracking the location of an electronic device includes an electronic device and a computer-readable storage medium. The computer-readable storage medium includes one or more programming instructions that, when executed, cause the electronic device to receive from a wireless location tag that is communicatively coupled to a port of a target electronic device one or more instructions comprising identifying information associated with the target electronic device and tag identifying information associated with the wireless location tag, associate at least a portion of the identifying information with at least a portion of the tag identifying information, receive one or more ping messages from the wireless location tag, wherein each ping message comprises location information indicating a current location of the wireless location tag, and associate at least a portion of the location information with the at least a portion of the identifying information associated with the electronic device.

The target electronic device may include a print device.

The computer-readable storage medium may include one or more programming instructions that, when executed, cause the electronic device to receive, from the wireless location tag, a notification that a previous location of the wireless location tag is different than the current location of the wireless location tag, and generate and present a notification to a user that the current location is different than the previous location.

The computer-readable storage medium may include one or more programming instructions that, when executed, cause the electronic device to receive, from the wireless location tag, a notification that the wireless location tag is disconnected from a power source for a period of time, and generate and present a notification to a user that the wireless location tag is disconnected from the power source.

DETAILED DESCRIPTION

Figure 1:
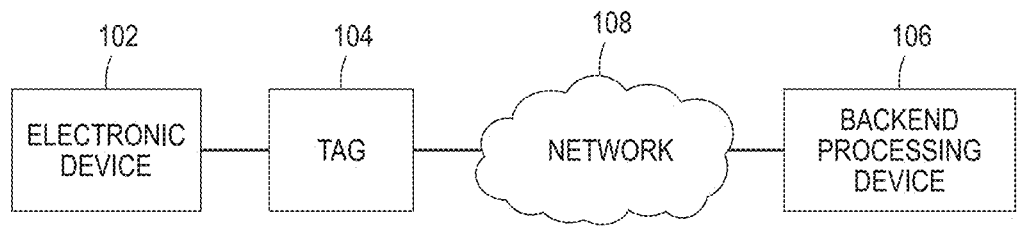
FIG. 1 illustrates example components of a system.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

The terms "computing device" and "electronic device" interchangeably refer to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface, as well as a camera for capturing images. An electronic device also may include one or more communication hardware components such as a transmitter and/or receiver that will enable the device to send and/or receive signals to and/or from other devices, whether via a communications network or via near-field or short-range communication protocols. If so, the programming instructions may be stored on the remote device and executed on the processor of the computing device as in a thin client or Internet of Things (IoT) arrangement. Example components of an electronic device are discussed below in the context of FIG. 6.

The terms "memory," "memory device," "computer-readable medium" and "data store" each refer to a non-transitory device on which computer-readable data, programming instructions or both are stored. Unless the context specifically states that a single device is required or that multiple devices are required, the terms "memory," "memory device," "computer-readable medium" and "data store" include both the singular and plural embodiments, as well as portions of such devices such as memory sectors.

A "print device" or "print engine" is an electronic device that is configured to print a document based on digital data, or a multi-functional device in which one of the functions is printing based on digital data. Example components of a print device include a print head, which may include components such as a print cartridge or reservoir containing ink, toner or another print material, as well as a document feeding system configured to pass a substrate through the print device so that the print head can print characters and/or images on the substrate.

A "processor" or "processing device" is a hardware component of an electronic device that is configured to execute programming instructions. The term "processor" may refer to a single processor or to multiple processors that together implement various steps of a process. Unless the context specifically states that a single processor is required or that multiple processors are required, the term "processor" includes both the singular and plural embodiments.

FIG. 1 illustrates example components of a system 100 for performing real-time location tracking of an electronic device according to various embodiments. As illustrated in FIG. 1, a system 100 may include a target electronic device 102, a wireless location tag 104, and a backend electronic device 106. As explained in more detail throughout this disclosure, the wireless location tag 104 may be connected to the target electronic device 102 via an Ethernet port of the electronic device. The wireless location tag 104 may communicate with the backend electronic device via one or more communication networks 108. A communication network 108 may be a local area network (LAN), a wide area network (WAN), a mobile or cellular communication network, an extranet, an intranet, the Internet and/or the like. In various embodiments, a target electronic device 102 may be a print device, a multifunction device, a laptop computer, a mobile electronic device, a desktop computer and/or the like.

In various embodiments, a provider of a wireless location tag may be the same as a provider or operator of a backend electronic device and/or a target electronic device. For instance, a provider of a wireless location tag may also provide location monitoring or tracking services via one or more backend electronic devices. Alternatively, a provider of a wireless location tag may be different from a provider or operator of a backend electronic device and/or a target electronic device. For instance, a provider of a wireless location tag may not provide location monitoring or tracking services via one or more backend electronic devices. These services may be provided by a different provider. Similarly, the operator of a target electronic device may be different from the provider of the wireless location tag and/or a backend electronic device.

Figure 2:
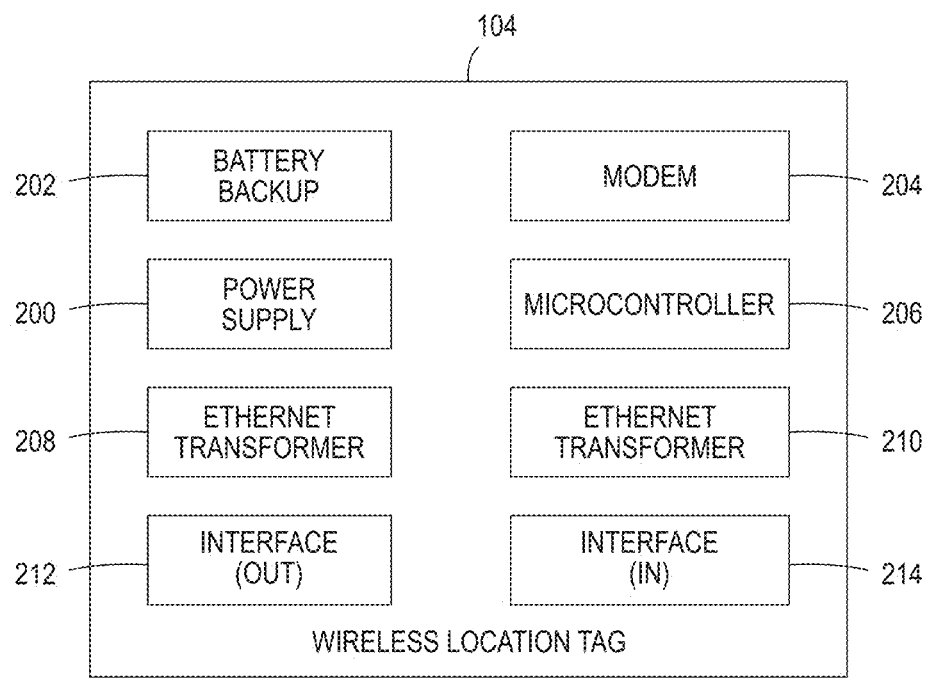
FIG. 2 illustrates example components of a wireless location tag.

FIG. 2 illustrates example components of a wireless location tag 104 according to various embodiments. As shown in FIG. 2, a wireless location tag 104 may include a power supply 200 that is configured to receive power from an external source. For example, a power supply may be a battery that is powered by an external electrical power source. A wireless location tag 104 may include a backup battery 202 which may power the wireless location tag when the power supply is depleted or disconnected. A wireless location tag 104 may include a modem 204 such as, for example, a cellular model. For instance, a wireless location tag 104 may include an LTE modem in certain embodiments.

A wireless location tag 104 may include a microcontroller unit 206, which may perform one or more of the location-tracking methods described in this disclosure. The microcontroller unit 206 may be in communication with two Ethernet transformers 208, 210. One Ethernet transformer 208 may be associated with a modular connector interface 212 that serves as an out-interface. The other Ethernet transformer 210 may be associated with a modular connector interface 214 that serves as an in-interface. In various embodiments, a modular connector interface may be an Eight Position, Eight Contact pin array (8P8C) connector such as, for example, an RJ45 connector.

Figure 3:
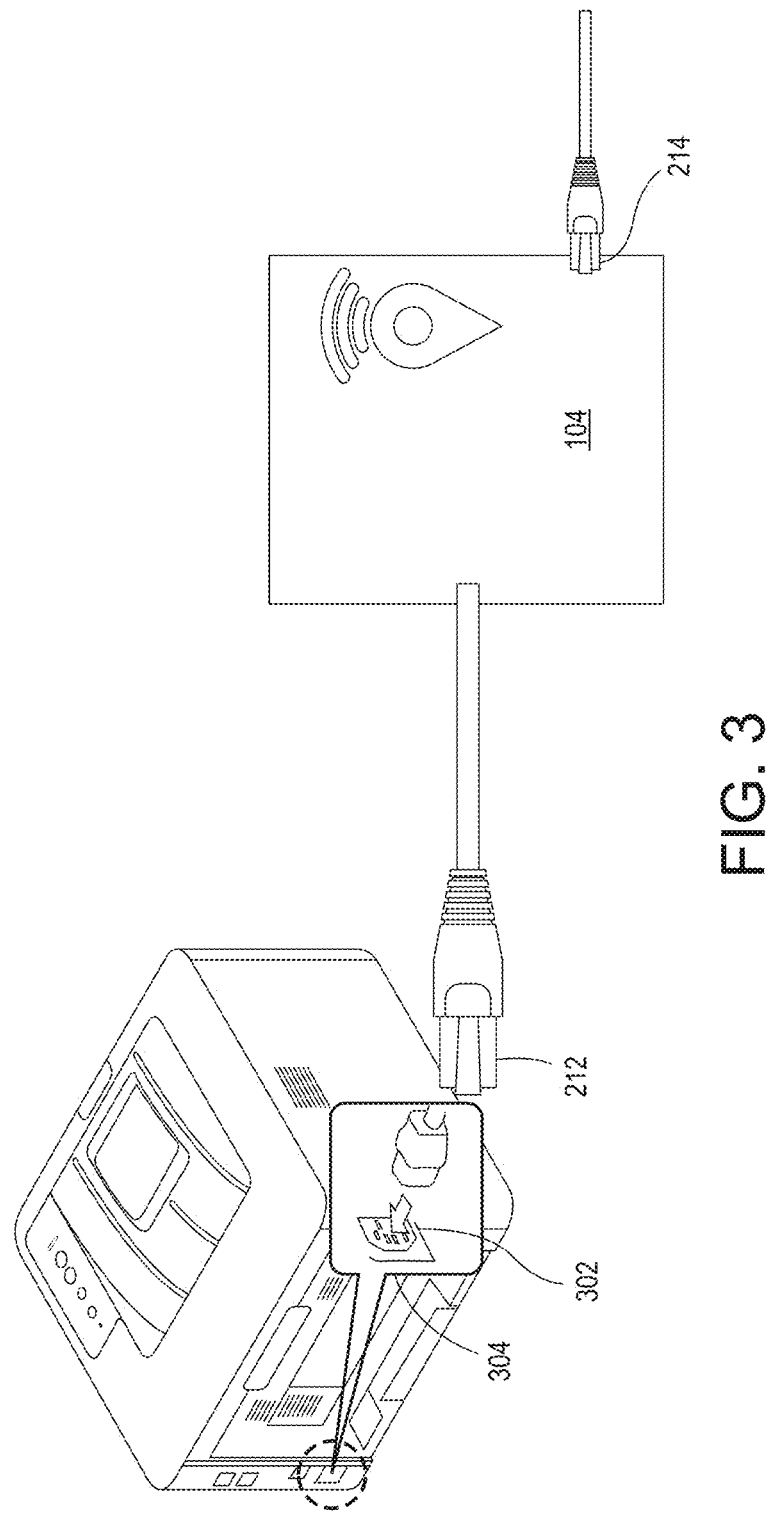
FIG. 3 illustrates an example wireless location tag connected to a print device.

FIG. 3 illustrates an example wireless location tag connected to an electronic device, such as, for example, a print device, according to various embodiments. As illustrated in FIG. 3, a wireless location tag 104 may be inserted into an Ethernet port of an electronic device 302 such that a modular connector interface 212 that serves as an out-interface of the wireless location tag interfaces with a modular connector interface 304 of the electronic device. As illustrated in FIG. 3, a modular connector interface 214 that serves as an in-interface of a wireless location tag may be in communication with a communication network such as, for example, a local communication network.

Figure 4:
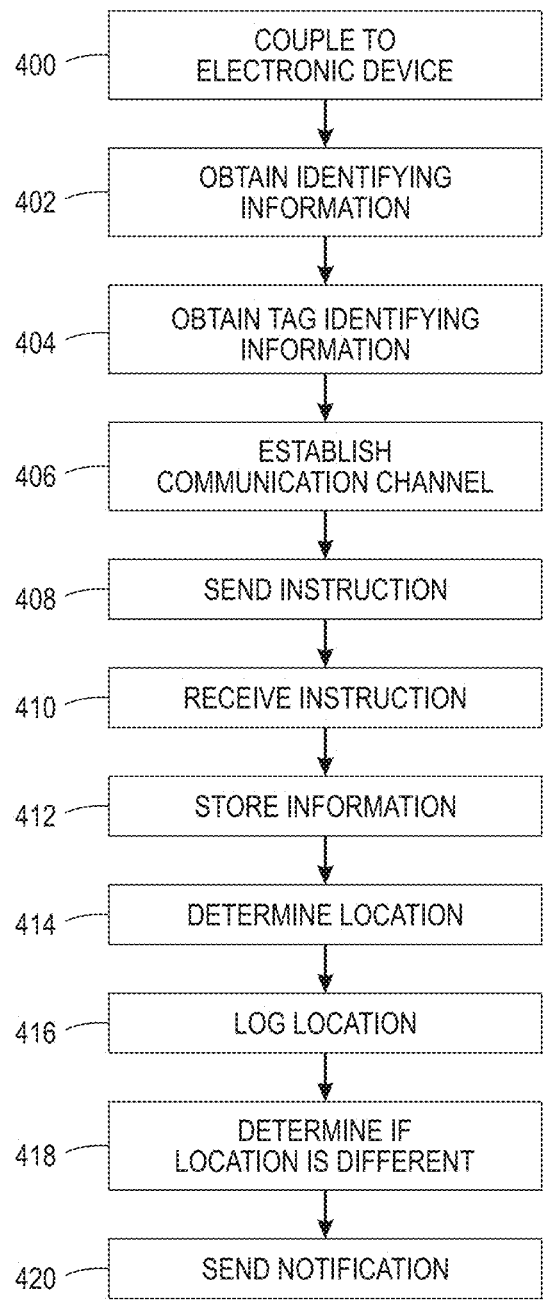
FIG. 4 illustrates a flow chart of an example method of associating a wireless location tag with an electronic device.

FIG. 4 illustrates an example method of associating a wireless location tag with an electronic device according to an embodiment. As illustrated in FIG. 4, a wireless location tag may be communicatively coupled 400 to an electronic device to which it is to be associated. A wireless location tag may be communicatively coupled by inserting it into an Ethernet port of an electronic device. Alternatively, a wireless location tag may wirelessly connect to an electronic device such as, for example, via short range communication.

In various embodiments, a wireless location tag may detect that it has been communicatively coupled to an electronic device. Once coupled, a wireless location tag may connect to a communication network such as, for example, the Internet. A wireless location tag may connect to a communication network through a local communication network such as, for instance, via the Ethernet port of the electronic device, or using WiFi. Alternatively, a wireless location tag may utilize a cellular network (e.g., a LTE/GSM network) to connect to a communication network.

Once connected to an electronic device, a wireless location tag may obtain 402 identifying information from the electronic device. Identifying information may include, for example, a media access control (MAC) address, an Internet Protocol (IP) address, a serial number or other identifiers associated with the electronic device.

In various embodiments, a wireless location tag may obtain 404 identifying information associated with the wireless location tag. Identifying information may include a unique identifier associated with the wireless location tag. At least a portion of identifying information associated with a wireless location tag may be stored on a microcontroller unit of the wireless location tag.

The wireless location tag may establish 406 a communication channel to a backend electronic device such as, for example, via an Internet connection. The backend electronic device may be located remotely from the electronic device. In an embodiment, the wireless location tag may send 408 an association instruction to the backend electronic device. The association instruction may include at least a portion of the identifying information associated with the electronic device and/or the identifying information associated with the wireless location tag.

The backend electronic device may receive 410 the association instruction. The backend electronic device may store 412 at least a portion of the information included in the association instruction in a data store so that it is associated. For instance, an electronic processing device may store identifying information associated with an electronic device that is included in an association instruction in association with identifying information associated with a wireless tag that is included in the association instruction.

In various embodiments, a wireless location tag may periodically determine 414 its current location. For instance, a wireless location tag may determine its current location at regular intervals. Alternatively, a wireless location tag may determine its current location at random times or in response to one or more triggers. A trigger may be the occurrence or non-occurrence of one or more actions. For instance, if a wireless location tag detects that it has lost power, this may be a trigger to determine a current location.

In an embodiment, a wireless location tag may determine 414 its location using an indoor location system such as, for example, WiFi-based indoor location systems, proximity-based systems, acoustic systems, and infrared systems. An indoor location system refers to technology that allows for locating objects indoors.

For example, in a WiFi-based indoor location system, a wireless location tag may communicate with one or more wireless access points in an environment. For instance, in an office setting, a wireless location tag may be connected to a print device. The wireless location tag may communicate with one or more wireless access points in proximity to the print device. A wireless access point refers to a hardware electronic device that permits a wireless enabled electronic device to connect to a wired network. A wireless access point may be a standalone device which is positioned at various locations in the environment. Alternatively, a wireless access point may be a component of another device, such as, for example, a router which is similarly positioned throughout an environment. The wireless access points may be present in a high enough density to service an entire environment.

In various embodiments, a wireless access point may log the time and the strength of one or more communications from a wireless location tag. The wireless access point may send at least part of the logged information to an electronic device such as, for example, a backend electronic device. The backend electronic device may use the received information to estimate a location of the wireless access tag. For example, an electronic device may use the received information to determine a position of the wireless location tag relative to a fixed point in the environment. An electronic device may store or have access to a map of a relevant environment, and may use the map to determine a position of the wireless location tag relative to a reference point. This position may be measured as a certain distance from a reference point, or as one or more position coordinates, such as longitude and latitude.

In another embodiment, a wireless location tag may determine 414 its location using cellular technology. For instance, Secure User Plane Location (SUPL) protocol may be used to pinpoint the location of a wireless location tag. The SUPL protocol is an Internet Protocol (IP)-based protocol for receiving location information via IP. This location information may be used in connection with a map of an environment, which may be stored by one or more backend electronic devices.

In various embodiments, a wireless location tag may log 416 its current location. A wireless location tag may log 416 its current location by saving an indication of the current location in a local data store on or in communication with the wireless location tag. An indication of a current location may be one or more coordinates of the current location. In an embodiment, a wireless location tag may send one or more ping messages to one or more backend electronic devices. A ping message refers to a communication that includes an indication of a wireless location tag's current location. In various embodiments, a wireless location tag may regularly send ping messages to one or more backend electronic devices. In another embodiment, a wireless location tag may send one or more ping messages to one or more backend electronic devices in response to a trigger event, as described in more detail below. In an embodiment, one or more backend electronic devices may store such information in association with at least a portion of the identifying information associated with the print device and/or the wireless location tag.

After logging a current location, a wireless location tag may determine 418 whether the current location differs from a logged immediately preceding location. If the current location differs from an immediately preceding location, the wireless location tag may send 420 a notification to a backend electronic device that its location has been changed. The backend electronic device may in turn generate a notification and present the notification to a user to notify the user, such as an administrator, of the change of location.

In various embodiments, as mentioned above, a wireless location tag may send a backend electronic device a notification if one or more trigger events occur. For instance, a wireless location tag may send a backend electronic device a notification if the wireless location tag detects that it is unplugged from an electronic device's Ethernet port, or if it detects that the electronic device is powered off for a period of time. Similarly, a wireless location tag may send a backend electronic device a notification if it loses power or is otherwise using its backup power source. The backend electronic device may in turn generate a notification and present the notification to a user to notify the user of the trigger event.

Figure 5:
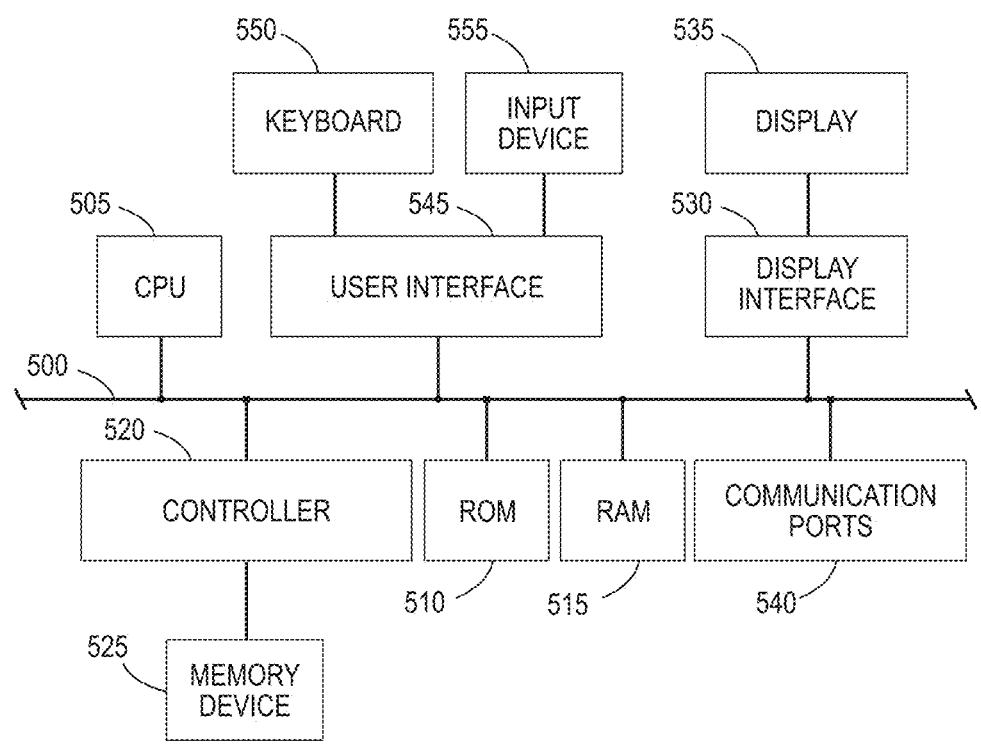
FIG. 5 is a block diagram showing various equipment that may be used to implement various embodiments of the processes described in this document.

FIG. 5 depicts an example of internal hardware that may be included in any of the electronic components of the system, such as a print device having a processing capability, or a local or remote computing device that is in communication with the print device, or a barcode scanning device. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525 that may store the programming instructions. A memory device may include a single device or a collection of devices across which data and/or instructions are stored. Various embodiments of the invention may include a computer-readable medium containing programming instructions that are configured to cause one or more processors, or other devices to perform the functions described in the context of the previous figures.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a wireless antenna, an RFID tag and/or short-range or near-field communication transceiver, each of which may optionally communicatively connect with other components of the device via one or more communication system. The communication device(s) 540 may be configured to be communicatively connected to a communications network, such as the Internet, a local area network or a cellular telephone data network.

The hardware may also include a user interface sensor 545 that allows for receipt of data from input devices 550 such as a keyboard, a mouse, a joystick, a touchscreen, a touch pad, a remote control, a pointing device and/or microphone.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A wireless location tag comprising:
    a connector configured to connect to an object;
    a communication interface; and
    a processor configured to:
        obtain identifying information that is associated with the object;
        determine a first location of the wireless location tag;
        determine a subsequent location of the wireless location tag; and
        when the subsequent location is different than the first location, send a ping message to a backend electronic device using the communication interface, the ping message comprising the identifying information associated with the object and the subsequent location of the wireless location tag.

2. The wireless location tag of claim 1, wherein the communication interface comprises a cellular modem.

3. The wireless location tag of claim 1, wherein the processor is configured to determine the first and subsequent locations of the wireless location tag using a network protocol.

4. The wireless location tag of claim 1, wherein the ping message further comprises a unique tag identifier.

5. The wireless location tag of claim 4, wherein:
    the processor comprises a microcontroller; and
    at least a portion of the unique tag identifier is stored on the microcontroller.

6. The wireless location tag of claim 1, wherein obtaining identifying information that is associated with the object comprises using near-field or short-range communication protocol.

7. The wireless location tag of claim 1, wherein sending the ping message to the backend electronic device causes the backend electronic device to generate a notification and present the notification to a user.

8. The wireless location tag of claim 1, further comprising a power supply and a backup power supply, wherein the wireless location tag is configured to switch to the backup power supply when the power supply is depleted or disconnected.

9. The wireless location tag of claim 8, wherein the processor is further configured to, in response to the wireless location tag using the backup power supply, send a notification message to the backend electronic device.

10. The wireless location tag of claim 1, wherein the connector is configured to be inserted into the object.

11. A method comprising connecting the wireless location tag of claim 1 to the object, wherein connecting the wireless location tag to the object causes the wireless location tag to send the ping message to the backend electronic device, wherein sending the ping message to the backend electronic device causes the backend electronic device to associate the wireless location tag with the object.

12. The method of claim 11, wherein connecting the wireless location tag to the object comprises inserting at least a portion of the wireless location tag into an Ethernet port of the object.

13. The method of claim 12, wherein inserting at least a portion of the wireless location tag into the Ethernet port of the object comprises inserting at least a portion of the wireless location tag into a print device.

14. The method of claim 12, further comprising receiving, from the backend electronic device, a notification that the wireless location tag has been unplugged from the Ethernet port.

15. The method of claim 11, further comprising receiving, from the backend electronic device, a notification that the wireless location tag is using a backup power supply.

16. The method of claim 11, further comprising receiving, from the backend electronic device, a notification that the wireless location tag has changed location.

* * * * *